Oct. 6, 1970  M. S. MARTIN  3,531,985
FLUIDIC SPEED AND DIRECTION TRANSDUCER
Filed Jan. 31, 1968  4 Sheets-Sheet 4

INVENTOR
MICHAEL STUART MARTIN
BY Ralph W. McIntire
ATTORNEY

United States Patent Office 3,531,985
Patented Oct. 6, 1970

3,531,985
FLUIDIC SPEED AND DIRECTION TRANSDUCER
Michael S. Martin, London, England, assignor to Westinghouse Brake & Signal Company, Ltd., London, England
Filed Jan. 31, 1968, Ser. No. 702,002
Int. Cl. G01m 15/00
U.S. Cl. 73—116          21 Claims

ABSTRACT OF THE DISCLOSURE

A fluidic speed and direction transducer in which a perforated disc rotating with a shaft interrupts a fluid input to a fluid logic system which provides pulses to fluid pressure reservoir at a frequency varying with the speed of the shaft. The reservoir pressure varies in accordance with pulse frequency to operate different ones of a plurality of fluid logic systems each having a bistable device switchable at a different reservoir pressure to operate a corresponding speed indicator. The direction of shaft rotation is detected in one embodiment by a fluid logic system which energizes a forward or reverse indicator in accordance with the sequence of pulses occurring at a plurality of inputs, which sequence occurs in opposite mode for opposite rotation of the disc. In another embodiment, by arranging two rows of perforations in concentric circles on the disc so that the rows are slightly offset circumferentially, a bistable fluid device is switched to one or the other of two output conditions for a longer time, depending upon direction of shaft rotation, so that one or the other of two fluid pressure reservoirs attains a higher pressure thus indicating shaft direction.

---

The performance of a shaft will be understood to include speed and/or direction of rotation of a shaft.

According to the present invention there is provided indication apparatus for providing indication of the performance of a moving body including a source of fluid pressure to an input fluid pressure line, a member displaceable on rotation of the body to apply pulses of fluid pressure from said line to one or more fluid pressure output lines and fluid logic apparatus responsive to the frequency and/or pattern of occurrence of said pulses in the fluid pressure output line or lines to produce the indication.

The member may comprise a part having perforations which on rotation of a shaft which constitutes the body, pass between fluid pressure input and output lines to intermittently provide fluid pressure communication between said input and output lines.

For the purpose of providing an indication of speed of a shaft, fluid pulses, the frequency of which is proportional to the speed, may be applied to a fluid pressure responsive device which converts the pulses into pulses of fluid pressure of constant width, the constant width pulses being applied to an integrating reservoir having a predetermined leakage path the pressure of which reservoir thereby constitutes an indication of the speed.

The output of such a reservoir may be applied to one or more bistable fluid pressure responsive devices adjusted to be switchable from one condition to the other at a predetermined pressure differential or differentials applied thereto.

Pressure difference application means may be provided in conjunction with the bistable fluid pressure responsive device or devices.

For the purposes of indication of the direction of rotation of the shaft, the shaft may be arranged to cause on rotation a succession of fluid pressure pulses at first, second and third points in turn, and fluid pressure operable means may be provided responsive to the occurrence of a fluid pressure pulse at the first point followed by a pulse at the second point to give an indication of one direction and the occurrence of a fluid pressure pulse at the third point followed by a pulse at the second point to give an indication of the other direction.

Alternatively, for the purpose of indicating direction of rotation of a shaft, the apparatus may include a device for producing fluid pulses in spaced pairs, the spacing of the pulses of a pair being substantially less than the spacing of the pairs, the first pulse of a pair being operable to set a two-state device to a first state to charge a first reservoir and the second pulse of a pair being operable to set the two-state device to a second state to charge a second reservoir and means responsive to the reservoir pressures to provide an indication of said direction.

The present invention is especially applicable to indication apparatus for providing indication of speed and direction of rotation of the shaft of a marine engine. In the marine engineering art, the performance of certain controlling operations in connection with a marine diesel engine is strictly dependent upon the speed and the direction of rotation of the engine at a given time. For instance, it is practice to start an engine by applying a short burst of compressed air to the engine, and if the engine is not started thereby, to repeat the operation. In the interests of economy of compressed air, speeding up of the engine following the initial burst producing a successful start is required to be detected to inhibit the repetition of the operation. Similarly, during a reversing operation it is necessary to provide speed and direction indication to insure that a reverse start is not initiated until the forward speed of the engine has been reduced below a permissible rotational speed. This is particularly so in the case of a "crash" reversing maneuver during which automatic reverse starting must only occur when conditions permit, despite a "crash" operation of the control lever on the bridge of a ship.

In order that the present invention may be more clearly understood and readily carried into effect, the same will be further described by way of example with reference to the accompanying drawings, in which.

Figure 4A:
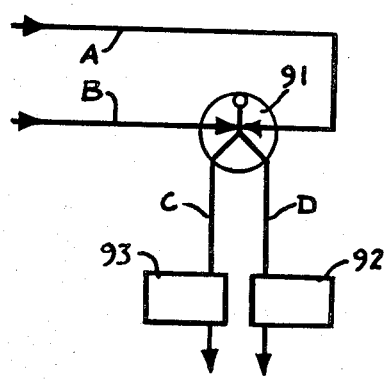

FIGS. 4a, b and c illustrate another means for sensing direction of motion, and

Figure 5:
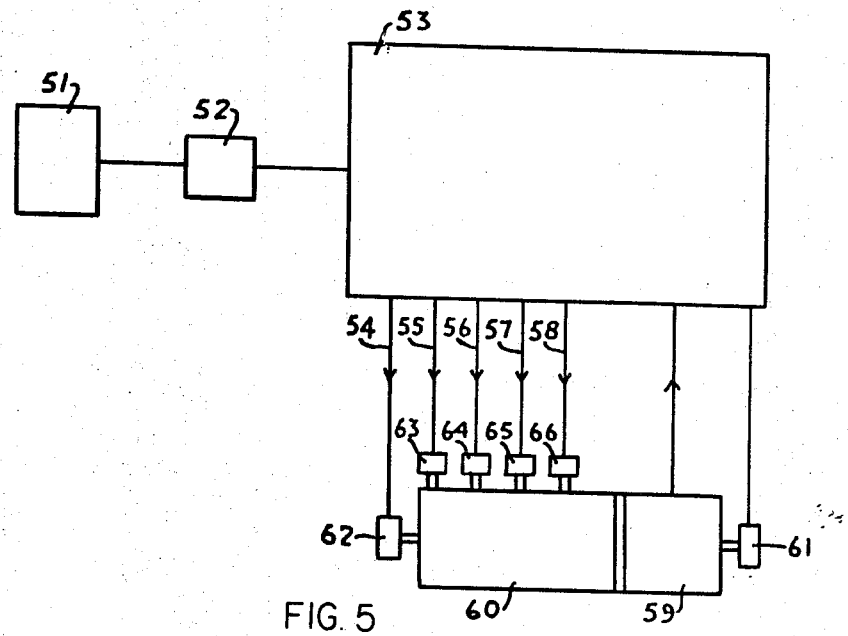

FIG. 5 constitutes a block diagram illustrating the application of the invention to the control of the operation of a marine engine.

Figure 1:
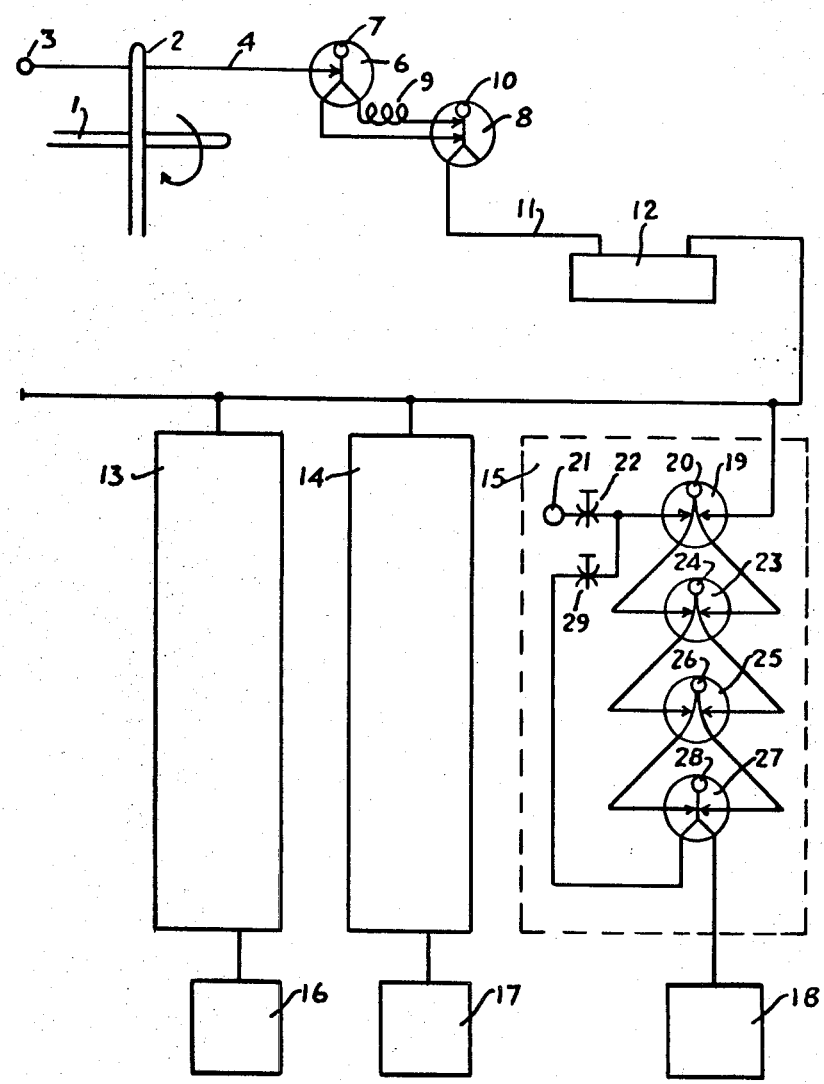
FIG. 1 illustrates a fluid logic circuit arrangement for providing an indication of the speed of a shaft.

Referring to FIG. 1, the shaft, the speed of which is required to be indicated, is mechanically coupled either directly or through gears to the shaft 1, and the shaft 1 carriers a disc 2 having perforations around the periphery thereof. A source of air pressure, say, 5 p.s.i., is connected to the input point 3 and is applied to an outlet which engages one side of the disc 2 at a point along the line of travel of the perforations in the disc. An output lead 4 from the other side of the disc to the previously mentioned lead is connected to the control input port of a fluidic gate device 6. This gate device has an input port 7 connected to a predetermined source of pressure, say, 4 p.s.i., and has two output ports, one connected directly to a control port of a further device 8 and the other connected via a delay element 9 to the other control port of the device 8. Similarly, the device 8 has an input supply port 10 also connected to the fixed supply pressure of approximately 4 p.s.i. An output from the gate device 8 is connected via a fluid path 11 to a storage reservoir 12. The output of the storage reservoir 12 is connected to a plurality of pressure sensing devices represented as blocks 13, 14 and 15 as shown. These devices are basically bistable circuits having a reference supply and on attainment of a predetermined pressure differential thereto they provide output to the indication units 16, 17 and 18 respectively. The devices 13, 14 and 15 are each adjusted to be responsive to different pressures of the reservoir 12 and, therefore, give indications via 16, 17 and 18 at different pressure levels.

In the event of smoothing of the input being required, the reservoir 12 may consist in practice of two reservoirs with a choke between them, the output being taken from the second reservoir.

The contents of the block 15, to which the contents of 13 and 14 are substantially identical except for the adjustment thereof, are shown in greater detail and it will be seen that the output of 12 is applied to one side of a fluidic differential amplifying device 19 which has a source of supply of, say, 3 p.s.i. at its input port 20. The other input of the amplifier device 19 is connected via a restricting valve 22 to a supply point 21 to which is connected a source of 5 p.s.i. The device 19 has two outputs, the value of pressure of which is dependent upon the pressure difference between the inputs to the device and these outputs are applied as inputs to a further pressure differential amplifier device 23 having a supply port 24 connected to a source of 5 p.s.i. Again, the two outputs of 23 are applied as inputs to a further device 25 forming a further amplification stage also having a supply port 26 connected to a source of 5 p.s.i., and the outputs of this stage are applied as inputs to a bistable fluidic device 27. The device 27 has a supply port 28 connected to a source of 5 p.s.i. and has two outputs one of which is connected via a restricting valve 29 to the reference input to the amplifier device 19 and the other of which is connected to the fluidic responsive device 18 referred to above. The precise construction of the circuit 15 may be varied according to requirements. It may, for example, have additional stage or stages, the final one of which can, if desired, be made a monostable stage.

In operation of the arrangement, to provide indication of the speed of the shaft to which the shaft 1 is coupled, the rotation of the shaft produces pulses in the line 4, the frequency of which is directly proportional to the speed of the shaft. These fluidic pressure pulses on application to the device 6 since the device 6 is a NOR type of gate circuit, cause interruption of the pressure flow from the port 7 to the left-hand output thereof and this initiates a flow of air pressure from the port 10 to the left-hand output of the further device 8. The flow of air from the port 7 is transferred by pressure in the line 4 to the delay member 9 and the delayed pulse on arriving at the other input to the device 8 interrupts again the air flow to the line 11 and, therefore, a pluse in 4 produces a pulse of predetermined length in the line 11 for application to the reservoir 12. In interpulse periods, there is a leakage of the device 12 via the lines connected thereto and, therefore, the pressure build-up in the device 12 bears a direct relationship to the frequency of occurrence of pulses in the line 4, and therefore, the speed of the shaft. Comparison of the pressure in 12 with a reference takes place in each of the devices 13, 14 and 15 and referring to the device 15, it will be seen that the pressure applied to the left-hand input of the device 23 in relation to that applied to the right-hand input thereof is dependent upon the difference between the pressure transmitted via the valve 22 and the pressure applied to the right-hand input of the device 19. The difference in pressure between the inputs to 19 is, therefore, amplified at the inputs to 23 and subsequently at the inputs to 25. This takes the pressure difference up to a pressure level suitable for operation of the bistable device 27 and when the pressure difference is sufficient to switch the device, a transfer of output pressure is made from the left-hand output of 27 to the right-hand output and, therefore, to the device 18. The feedback path from the left-hand output of the bistable device 27 via the restriction 29 has the effect, immediately the device 27 tends to be switched, of reducing the pressure on the left-hand input of 19 thereby causing rapid switching of the device 27 and the feedback path, therefore, provides a degree of hysteresis of operation of the bistable arrangement. Adjustment, therefore, of the pressures at which the bistable devices of 13, 14 and 15 are switched can be made to provide outputs at 16, 17 and 18 at desired speeds of the shaft. It will be appreciated moreover that further devices may be employed set at different pressure levels of switching to provide a greater range of speed indications.

Figure 2:
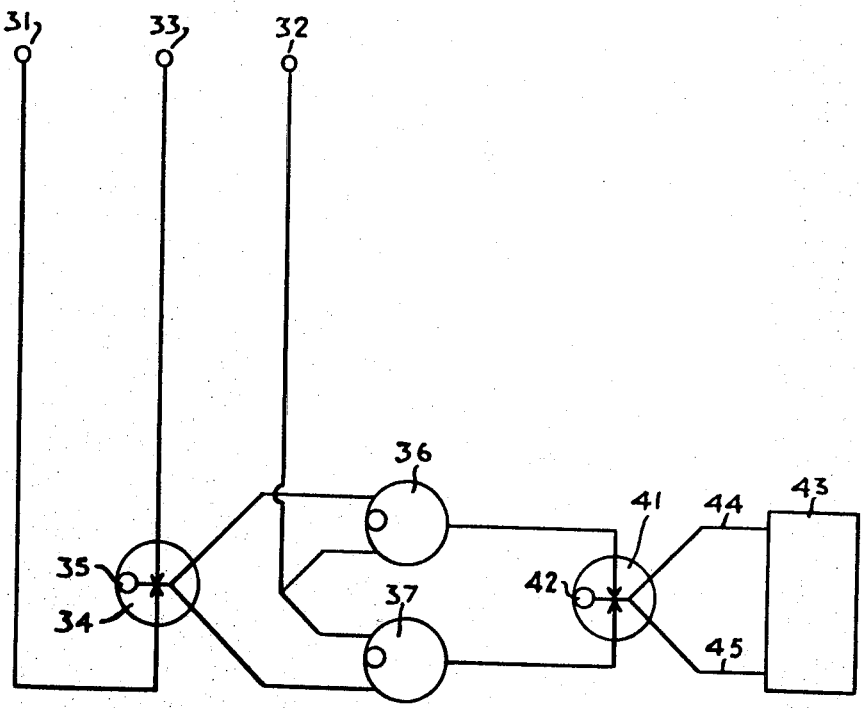
FIG. 2 illustrates a fluid logic circuit arrangement for providing an indication of forward or reverse direction of the rotation of a shaft.

Referring to FIG. 2, the fluidic locig circuit arrangement shown has three input ports 31, 32 and 33; these are connected to a similar arrangement to the rotating disc arrangement of FIG. 1 except that the disc arrangement is provided with three outputs such that on rotation of the disc it produces a succession of pulses at these ports. It will be appreciated, therefore, that in accordance with the direction of rotation of the disc and, therefore, of the shaft to which the disc is coupled, so the order of occurrence of fluid pressure pulses at terminals 31, 32 and 33 is determined. The input port 31 is connected via a fluid pressure line to one of two control ports of a bistable fluidic logic device 34. This device has a supply input port 35 to which a fluid pressure of 5 p.s.i. is applied and has two output ports and output pressure at which selectivity appears according to the state of the device. The second input port to the bistable device 34 is connected to the input port 33 of the logic circuit arrangement and the respective output ports of 34 are connected as respetcive inputs to fluidic logic AND gates 36 and 37, the second inputs to these gates being connected to the input port 32 of the circuit arrangement. The output ports of the fluidic logical AND devices 36 and 37 are further connected respectively to input control ports of a second bistable logic device 41 which has an input supply port 42 and respective output ports connected to a direction indication device 43, these outputs are denoted as 44 and 45.

In operation of the arrangement of FIG. 2, assuming that the disc, rotation of which causes the input pulses to be applied to the input ports of the arrangement, is rotating in a "forward" direction, this direction may be denoted by a sequence of pulses at input ports 31, 32 and 33, in that order. A pulse at 31 is applied to the bistable device 34 which, therefore, is switched into a condition in which it applies an input to one input port of the gate 36. The next pulse applied to the system, which is the pulse at 32, is transmitted to the input ports to 36 and 37 but only the gate 36 has an input from the device 34 and, therefore, a pulse is applied thereby to the bistable device 41 to provide an output from 41 on the line 45, to cause the device 43 to indicate the forward direction of the shaft. The subsequent occurrence of a pulse on the port 33 switches the device 34 into the opposition condition to that pertaining and this, therefore, applies an input pressure to one port of the gate 37 but in the absence of a pressure at the other port thereof, no output is derived from 37 to switch the bistable device 41 to its opposite condition. While, therefore, the shaft continues to rotate in the same direction, the output from 41 is derived in the line 45 and a continuous indication of the forward direction of motion is produced.

Assuming that the direction of rotation of the shaft is opposite to that referred to above and may be regarded as "reverse" direction, a pulse at the port 33 switches the bistable device 34 into a condition in which as aforesaid it applies pressure to a port of the device 37 and subsequent appearance of a pulse at the port 32 is transmitted to the second port of the AND gate 37. The bistable device 41 is, therefore, operated into its condition in which an output pressure is applied to the line 44 and the indication device 43, therefore, provides a "reverse" direction indication.

It will be appreciated that while direction and speed indication means are shown separately herein, these may be combined into a single apparatus and a single means displaceable on movement of the shaft may be employed to provide the variable frequency pulses to the portion of the apparatus which provides a speed indication and also the sequence of pulses to the portion of the apparatus which provides the direction indication.

Figure 3:
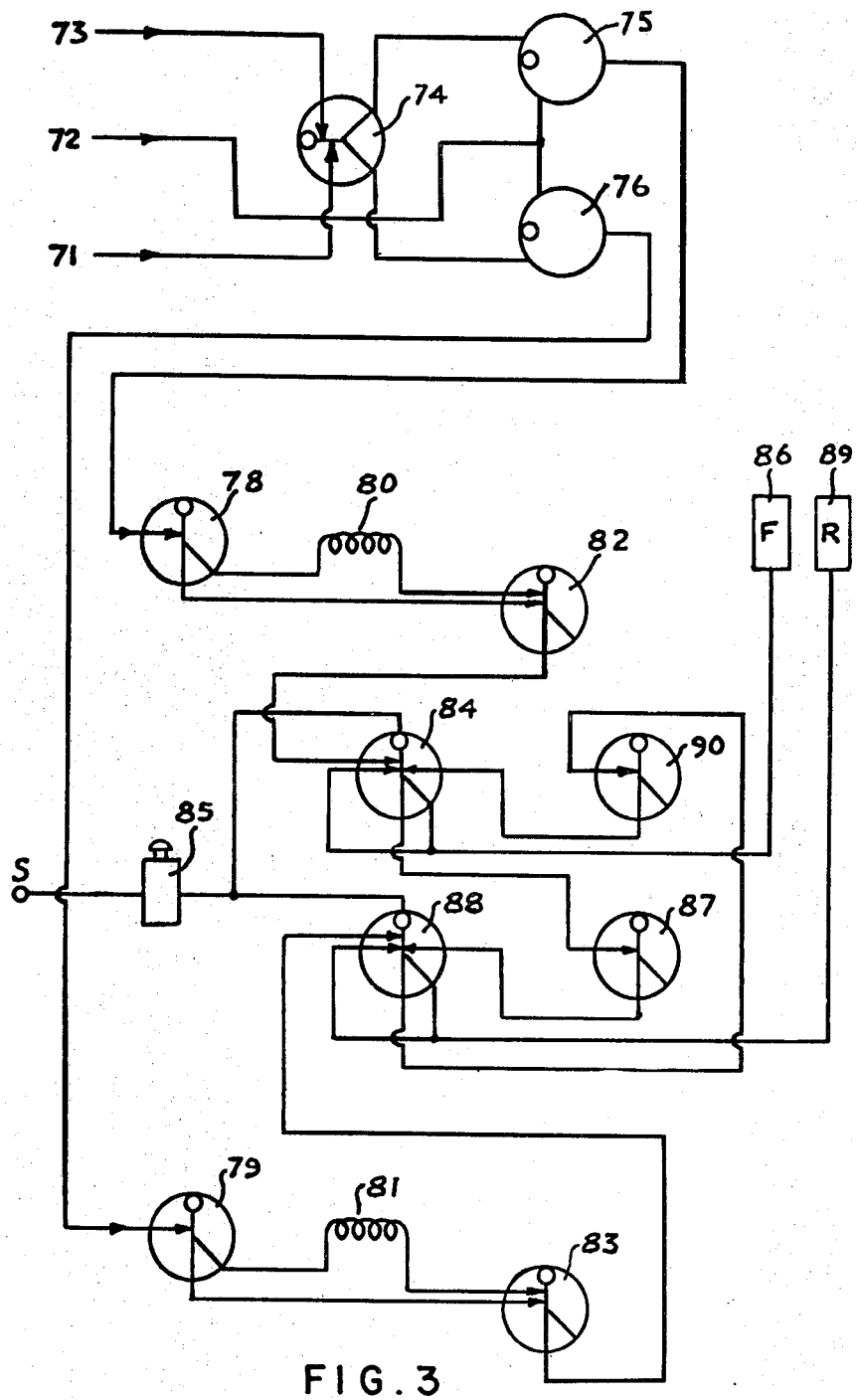
FIG. 3 illustrates an elaboration of the apparatus of FIG. 2 which is capable of indicating direction or standstill.

Referring to FIG. 3, which illustrates an elaboration on the circuit shown in FIG. 2 for providing indication of forward or reverse direction of rotation of a shaft and also indicating if the shaft is at a standstill, input points to which fluid pressure pulses are sequentially applied on rotation of the shaft are indicated by the references 71, 72 and 73. The input 71 is applied to one side of a bistable device 74 and the input 73 is applied to the other side thereof. Connected to respective outputs of the bistable device 74 are respective inputs of AND gates 75 and 76 as shown. The other inputs to the gates 75 and 76 are connected in common to the input point 72. Further, the AND gates 75 and 76 have output ports connected to inputs of respective devices 78 and 79. The latter devices may be regarded as monostable circuits and have outputs connected from respective delaying elements 80 and 81 to inputs of further devices 82 and 83 as shown. Second inputs to the devices 82 and 83 are taken from the respective other outputs of 78 and 79. As will be seen hereafter, the elements 78, 80 and 82 and the elements 79, 81 and 83 constitute constant pulse width generating circuits similar to the circuit constituted by elements 6, 8 and 9 of FIG. 1.

The normal or "stable" output from the element 82 is applied as one input to a further fluidic element 84 which derives a fluid pressure supply from a source S via a manually operable push button switch 85. The operated condition output moreover of 84 is applied on the one hand to a fluidic plunger type indicator 86 and on the other hand to a further input to 84 to provide a holding pressure for the device 85 to hold it in the operated condition. The unoperated condition output of 84 is applied as an input to the fluidic bistable element 87, the normal or "stable" output from which is applied as a cancelling input to the element 88 which is associated with the output of 83 and corresponds in relationship thereto with that of 84 to the element 82. The output of 88 in the operated condition is applied to a further indicating plunger device 89 for indicating the opposite direction of rotaton of the shaft. Further, the operated output of 88 is connected over a holding link to a further input thereof and the unoperated ouput of 88 is applied as an input to an element 90 to apply a cancelling signal to the element 84. Similarly, the unoperated output of 84 is applied as an input to an element 87 to apply a cancelling signal to element 88.

Considering now the operation of the circuit arrangement of FIG. 3, and assuming that the shaft is rotating in a "forward" direction, such that pulses appear on the line 71, 72 and 73 in that order, this implies that the device 74 is switched into the condition in which one of the inputs of 75 is energized prior to the line 72 being energized to energize the other input of 75. Under these conditions output pulses are applied to the device 78 to divert the air flow therein into the delay element 80. This implies removal of the normally existing input to the device 82 and subsequent replacement thereof by the pulse output fro mthe delay 80. Assuming, therefore, that the delay period for the delaying element 80 is always less than the length of pulses applied to the element 78, constant width pulses are derived from the element 82 and applied to the element 84. Pulses thus applied to 84 cause deflection of the normal direction of flow of air therein from the now depressed push button 85 to the operated condition output and an indication of forward direction of rotation which is thereby produced on the indication device 86. Further, the operated condition output of 84 being connected to a further input thereto, this output maintains the operated condition of 84 so long as the push button 85 continues to be depressed. Since moreover in operation of the device 84 implies removal of the input otherwise present to the device 87, the device 87 provides an output which is effective as a resetting output to the device 88 such that had, since the button 85 was depressed, the direction of rotation changed from a reverse to a forward direction, the reverse indication would thereby be cancelled.

In operation of the arrangement for providing a reverse indication by pulses applied to inputs 73, 72 and 71 in that order to produce pulse outputs on the device 76 is similar to that described for forward indication and the device 89 produces the reverse indication. In the event moreover of the push button 85 being depressed when the shaft is stationary, no pulses are derived from the devices 75 or 76 and hence it will be appreciated that neither of the forward or reverse indication devices 86 and 89 produces an indication.

Figure 4B:
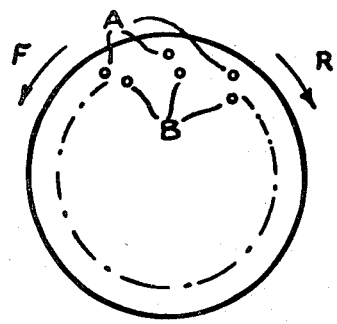
Figure 4C:
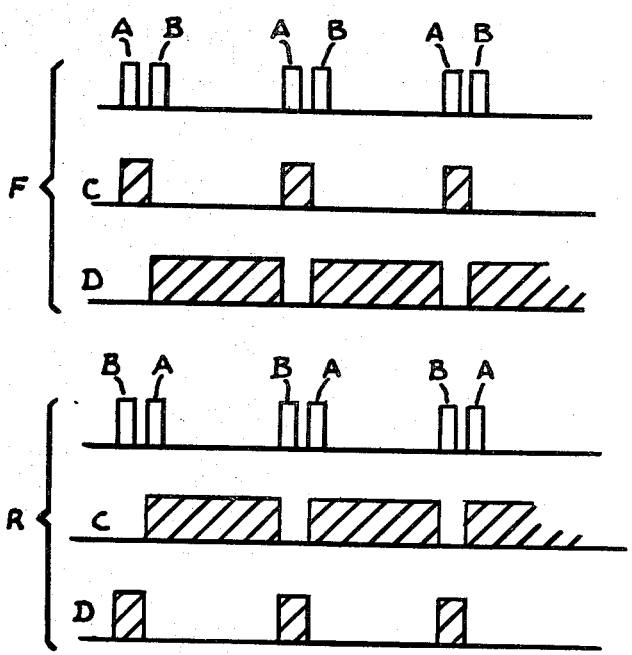

Referring now to FIG. 4, this illustrates the basis of operation of a simplified direction sensing arrangement and assuming that the circuit arrangement which is shown in FIG. 4a derives two inputs A and B from an interrupter disc as shown in FIG. 4b, the inputs alternately switch the bistable element 91 from one condition to the other, the sense of the switching depending upon the direction of rotation of the disc. The disc carries perforations which are in concentric circles, the perforation A being on an outer circle and the perforations B being on an inner circle slightly displaced rearward of the perforation A, but the pairs of perforations A, B being relatively greater spaced as compared with the spacings between the individual perforations of the pairs. The result of this is illustrated in the graphical explanation of the operation of the arrangement which is shown in FIG. 4c. The first three diagrams illustrate the pulses A and B and the effective inputs which are applied to output reservoirs 92 and 93 via the output leads c and d of the bistable element 91. For the forward direction of rotation represented by the arrow F in FIG. 4b, the pulses occur in the order A, B and the result of this is that the output D is energized for substantially longer than the output C and hence the pressure which is integrated into the capacitance 92 is substantially greater than that which is integrated into capacitance 93. When, however, the shaft carrying the disc is rotated in the opposite direction represented by the arrow R, the pulses to the bistable element 91 occur in the order B, A and the output lead C charging the capacitor 93 is energized for substantially longer than the output D charging the capacitor 92 and the capacitor 92, therefore, acquires a substantially less pressure than the intergated pressure into the capacitor 93. By having means for sensing the pressure in the two capacitors 92 and 93, it is, therefore, readily possible to provide an indication of the direction of rotation of the shaft.

As aforementioned, the invention is especially applicable to apparatus for controlling the operation of a marine engine, for the detection of the performance of a shaft and enabling certain operations to be performed only when predetermined conditions exist. In this connection, it is proposed that virtually all the signals from a control point such as the selector on the bridge of a ship in which a diesel engine is installed, shall be by the transmission of low air pressures of the order of 5 p.s.i to an interlock logical circuit arrangement employing fluid logic. Only at the output of the interlock arrangement are the low pressures converted by suitable relay valve devices to high pneumatic pressures for performing mechanical operation. Referring now to the block diagram of a typical system as shown in FIG. 5, the bridge selector of the ship is represented by the block 51 an output signals from this device which are low pressure air signals indicating the selection of the ahead or astern drive of the ship via the engine, are applied via a crash lock-up device 52 to the interlock circuit represnted by the block 53. Outputs from the interlock circuit appear on the lines 54, 55, 56, 57 and 58. Inputs to the circuit are applied from the speed and direction means 59 associated with the engine 60 and also an "ahead/astern" proving signal, indicating that a particular operation has been performed by the selection mechanism, is derived from the step-down device 61 which converts the signal from a high to a low pressure. The low pressure input 54 is applied to a step-up device associated with the engine 60 to apply a corresponding high pneumatic pressure input for control, and the inputs 55, 56, 57 and 58 are applied to respective relay valves providing high pressure outputs for operation of the engine, these valves being represented by references 63, 64, 65 and 66. The relay valve 63 receives signals from the interlock 53 when it is required to cut the fuel to the engine at low speeds. Valve 63, therefore, corresponds to the fuel rack stop for the engine and similarly 64 corresponds to the fuel rack limit for the engine. The application of starting air to the engine to swing the engine to start it is caused by a low pressure signal to the relay valve 65 and a signal for the purposes of braking the shaft when a signal to stop is made and the ship is moving, is applied to the relay valve 66 which thereby provides a high pressure signal to operate the braking arrangement.

The foregoing illustrates an outline of the essential facilities which may be provided for the operation of a diesel marine engine, but it will be appreciated that the specific requirements for various engines and various codes of operation, may vary.

Having now described the invention, what I claim as new and desire to secure by Letters Patent, is:

1. Apparatus for indicating the speed of a movable body, comprising: an input fluid pressure line, a source of fluid pressure for pressurizing said input fluid pressure line, an output pressure line, a member disposed for movement between said input pressure line and said output pressure line and displaceable upon movement of the movable body to apply fluid from said input pressure line to said output pressure line as a train of pulses at a frequency proportional to the speed of the movable body, fluid logic means responsive to said pulses in said output pressure line to produce corresponding pulses of uniform pulse width, said fluid logic means comprising first and second two-state devices and a pulse delay means, said first two-state device directly responsive to said output pressure line to assume a first output state in the absence of a pulse and to switch to a second output state in the presence of a pulse, said pulse delay means operable to provide a delayed output pulse in response to said second output state, said second two-state device responsive to said first output state of said first two-state device or the output state of said pulse delay means to assume a first output state and otherwise to assume a second output state, and means for integrating the pulses produced by said second output state of said second two-state device to provide a pressure proportional to the frequency of the output pulses of the second output state of said second two-state device.

2. Apparatus for indicating the speed of a movable body, comprising: an input fluid pressure line, a source of fluid pressure for pressurizing said input fluid pressure line, an output pressure line, a member disposed for movement between said input pressure line and said output pressure line and displaceable upon movement of the movable body to pass fluid from said input pressure line to said output pressure line as a train of pulses at a frequency proportional to the speed of the movable body, said body comprising a shaft, said member having perforations which on rotation of the shaft pass between said fluid pressure input and output line to intermittently provide communication between said input line and said output line, means for converting said pulses into pulses of uniform width, integrating reservoir means for receiving said pressure pulses of uniform width, said integrating reservoir means comprising a pair of reservoirs interconnected via choke means.

3. Apparatus for indicating the direction of movement of a movable body, comprising: a source of fluid pressure, three input lines adapted for pressurization by said fluid pressure source, a member disposed for movement between said fluid pressure source and said three input lines and movable in one direction or another corresponding to two directions of movement of the movable body, said member having aperture means therein for passing fluid from said fluid pressure source to said three input lines in a train of pulses occurring at said plurality of inputs in a different one of two reverse sequencies depending on the direction of movement of said member, a bistable fluid logic device responsive to a first pulse of one of said two sequencies to switch from one bistable state to another bistable state, a two input fluid logic AND device having one input responsive to said another bistable state of said first bistable fluid logic device, and the second pulse of said one sequence providing an input to the other input of said AND device.

4. Apparatus for indicating the direction of movement of a movable body, as recited in claim 3, further including: a second fluid logic two input AND device having one input responsive to said one bistable state of said bistable fluid logic device, the other of said two inputs of said second AND device responsive to said second input pulse of said one sequence, the third input pulse of said one sequence operable to switch said bistable device to said one bistable state.

5. Apparatus for indicating the direction of movement of a movable body, as recited in claim 4, in which, each of said first and second AND devices includes an output, and a second bistable fluid logic device having a pair of inputs each responsive to the output of different one of said first and second AND devices.

6. Apparatus for indicating the direction of movement of a movable body, as recited in claim 5, further including: a pair of means for producing pulses of uniform width, each connected to the output of a different one of said first and second AND devices, a pair of fluid logic devices each having a self-holding circuit and each responsive to a different one of said pair of uniform width pulse producing means to assume an output state, means cross-coupling said pair of fluid logic devices such that operation of one cancels operation of the other, and pressure responsive direction indicator means connected to respond to said output state of each of said pair of fluid logic devices.

7. Apparatus for indicating the direction of movement of a movable body, as recited in claim 6, in which manually operable switch means are provided to normally render said pair of fluid logic devices inoperable.

8. Apparatus for providing indication of the direction of movement of a movable body, comprising: a source of fluid pressure, a fluid pressure input line means pressurizable by said source of fluid pressure, a pair of output pressure lines, a member disposed for movement between said input and said pair of output pressure lines and movable with said movable body in either of two directions, said body comprising a shaft rotatable about its axis, said member includes aperture means therethrough which upon rotation of said shaft pass between said fluid pressure input and said pair of output lines to intermittently provide communication between said input means and said pair or output lines, said apertures disposed on said member to produce fluid pulses from said input line to said pair of output lines in spaced pairs, the spacing of said fluid pulses in each of said spaced pairs being substantially less than the spacing of the pairs, the pulses of each pair being delivered one to each of the pair of output lines in one of two opposite sequences depending upon the direction of movement of said member, a bistable device having a pair of inputs and a pair of outputs, a pair of reservoirs each connected to a different one of said outputs, each input of said pair of inputs being connected to respond to a different one of said pair of output lines.

9. A fluid logic control circuit, comprising: means for producing a train of pressure pulses at a frequency proportional to the speed of a moving body, a first fluid NOR device having a supply port, a control input port responsive to the pulses produced by the first said means, a first outut pressurizable only when the control port is pressurized, and a second output pressurizable only when the control port is depressurized, a second pure fluid NOR device having a supply port, a pair of control ports one of which is connected to said second output of said first NOR device, a first output pressurizable when either of said control ports is pressurized, and a second output pressurizable only when neither of said pair of control ports is pressurized, pulse delay means connected between said first output of said first NOR device and the other of said pair of control ports of said second NOR device, an integrating reservoir having an input connected to said second output of said second NOR device and having an output, and pressure responsive indicator means connected to said output of said integrating reservoir.

10. A fluid logic control circuit, as recited in claim 9, in which said pressure responsive indicator comprises a two-state device adjusted to switch from one stable condition to another at a predetermined pressure in said reservoir.

11. A fluid logic control circuit, as recited in claim 9, in which, said pressure responsive indicator means comprising a plurality of two-state devices each adjusted to be switched from one state to another at respective predetermined different pressures.

12. A control circuit, comprising: a fluid reservoir having an input and an output, means for providing to said input a train of fluid pulses having fixed time duration and at a frequency proportional to the speed of a moving body, pressure responsive indicator means connected to said output, said pressure responsive indicator means comprising a plurality of bistable two-state devices, each having a pair of inputs and a pair of outputs one of which outputs of each said pair of outputs being adapted for connection to a corresponding pressure responsive indicator device, one or the other of said outputs being pressurized depending upon which input is at the higher pressure, one of said pair of inputs of each of said plurality of two-state devices connected to said reservoir output, a source of fluid pressure, a plurality of variable chokes each connecting the other input of said pair of inputs of each two-state device to said source of fluid pressure, each of said plurality of variable chokes set to choke said source of supply by a different amount, and a plurality of additional variable chokes each communicating the other output of the corresponding one of said pair of outputs to said other input of said pair of inputs downstream of the corresponding one of said first mentioned plurality of variable chokes.

13. A fluid logic control circuit, comprising: first means for generating a train of fluid pressure pulses at a frequency corresponding to the speed of a monitored object, second means responsive to said first means for rendering said pulses of uniform length in time, said second means comprising first and second pure fluid devices each having two output pressure states, pulse delay means having an input and an output, said first pure fluid device operable in response to each pulse from first means to switch said second pure fluid device to one output pressure state and provide an output to the input of said pulse delay means, said output of said pulse delay means connected to said second pure fluid device to switch second pure fluid device to the other output pressure state after a predetermined time delay following said switching of the second pure fluid device to said one output pressure state, reservoir means for integrating successive ones of said one of said two output pressure states of said second pure fluid device, and means for indicating pressure in said reservoir means.

14. Apparatus for indicating the direction of motion of a movable member, comprising: a plurality of inputs, means for generating pressure pulses occurring in a different sequence at said plurality of different inputs for each of a plurality of different directions of movement of a monitored moving body, pure fluid means switchable to providing different output pressure conditions depending upon the sequence of occurrence of pulses at said inputs, and means responsive to said different output conditions to provide a different indication for each said different output conditions.

15. Apparatus for indicating the direction of motion of a movable member, as recited in claim 14, in which: said means for generating pressure pulses comprises a second member movable with said movable member in each of two opposite directions and including a plurality of equidistant rows of an equal number of apertures therethrough extending along the opposite directions of travel of said movable member, said apertures of one of said rows being offset in one direction of travel of said movable member relative to the aperatures in the other row by a uniform amount less than the minimum distance between apertures in one of said rows; means for impinging a fluid jet means transversely on said second member to pass fluid pressure through said apertures of said plurality of rows as said second movable member moves relative to said fluid jet means, and said plurality of inputs comprising two inputs each disposed on the side of said second movable member opposite said jet means to receive said fluid pressure passing through a different one of said two rows of apertures.

16. Apparatus for indicating the direction of motion of a movable member, as recited in claim 14, in which: said pure fluid means comprises a two-state device having a pair of outputs and a pair of inputs, each of said pair of inputs when pressurized operable to pressurize a different one of said pair of outputs, said pair of inputs comprising said first mentioned inputs, and capacitor means connected to said pair of outputs to assume different pressure conditions depending upon which output is pressurized the longer time.

17. A fluidic control circuit for selectively indicating at least one of a pluarlity of different sequences of occurrence of pressure pulses in a train of pressure pulses, each successive pulse of a predetermined number of said pulses occurring at a different one of a plurality of inputs, comprising: a bistable fluidic device having two outputs and two inputs, a fluidic AND device having a pair of inputs and an output, one of which inputs is connected to one of said two outputs of said bistable device, said plurality of inputs comprising said two inputs of said bistable device and the other one of said pair of inputs of said AND device, a second fluidic AND device having two inputs and an output one of which two inputs is connected to the other output of said two outputs of said bistable device, the other one of said two inputs of said second fluidic AND connected in common with said other input of the first mentioned AND device, and pressure responsive means including indicator means for indicating the state of pressurization of said output of said AND device and said output of said second AND device.

18. A fluidic logic circuit, as recited in claim 17, in which said pressure responsive means further includes a second bistable device having a pair of inputs each connected to an output of a different one of said first mentioned AND device and said second AND device, and having a pair of outputs connected to said indicator means.

19. A fluidic control circuit, as recited in claim 17, further including: a pair of means for producing a constant width output pulse for each input pulse thereto, each of said pair of means responsive to the output of a different one of said first mentioned AND device and said second AND device, a pair of monostable devices each operable to provide an output in response to the output of a different one of said pair of means, each of said pair of monostable devices having an output connected to its own input as a self-holding means, means cross coupling said monostable devices so that an output from either cancels said output of the other.

20. A fluidic control circuit, as recited in claim 19, in which said pair of monostable devices each includes a supply port, and means including manually operable switch means to control communication of supply to each of said supply ports.

21. A speed and direction indicating apparatus, comprising: fluid pressure line means having outlet means and adapted to be pressurized by a source of fluid pressure, a plurality of lines each having inlet means axially spaced from said outlet means for receiving fluid pressure from said outlet means, a member adapted for movement with a monitored movable body movable in two opposite directions at different speeds in each direction, said member disposed for movement transversely between said inlet means and outlet means and having aperatures therethrough for passing fluid from said outlet means to said inlet means in the form a a train of fluid pressure pulses to the inlet means of said plurality of lines, each successive pulse occurring at the inlet means of a different one of said plurality of line means in a repeatable sequence which varies with the direction of movement of said member and at a frequency proportional to the speed of said member, means responsive to the sequence of pulses at said inlet means of said plurality of lines to assume one condition or another depending upon the prevailing pulse sequence, an additional line having an inlet adapted to receive fluid pressure from said outlet means through the same apertures which pass fluid to the inlet means of one of said plurality of lines, pulse width modulating means for providing all pulses received from said additional line with a uniform length, reservoir means for integrating the pulses of uniform length as a reservoir pressure, and means indicating the reservoir pressure.

References Cited
UNITED STATES PATENTS

| | | | |
|---|---|---|---|
| 3,239,142 | 3/1966 | Levine | 235—201 |
| 3,250,470 | 5/1966 | Grubb | 235—201 |
| 3,288,365 | 11/1966 | Shuki | 235—201 |
| 3,352,267 | 11/1967 | Brandriff et al. | 235—201 X |
| 3,409,032 | 11/1968 | Boothe et al. | 137—81.5 X |

JERRY W. MYRACLE, Primary Examiner

U.S. Cl. X.R.

137—81.5; 235—201